United States Patent [19]

Borberg

[11] 4,176,672

[45] Dec. 4, 1979

[54] MIXING APPARATUS FOR A FIRST LIQUID COMPONENT WITH AT LEAST ONE ADDITIONAL COMPONENT

[75] Inventor: Hartmut Borberg, Munich, Fed. Rep. of Germany

[73] Assignees: Apparatebau Gauting GmbH, Gauting; Ernst Muller KG., Winnenden, both of Fed. Rep. of Germany

[21] Appl. No.: 863,732

[22] Filed: Dec. 23, 1977

[30] Foreign Application Priority Data

Nov. 1, 1977 [DE] Fed. Rep. of Germany ........ 2700875

[51] Int. Cl.² ............................................. G05D 11/13
[52] U.S. Cl. ................................... 137/99; 137/101.21
[58] Field of Search ................ 137/99, 101.21; 417/12

[56] References Cited

U.S. PATENT DOCUMENTS

| | | | |
|---|---|---|---|
| 2,564,306 | 8/1951 | Isreeli et al. ........................ | 137/99 |
| 3,038,486 | 6/1962 | Thurman ........................ | 137/101.21 |
| 3,397,646 | 8/1968 | Allsopp, Jr. ........................ | 137/99 |
| 3,575,535 | 4/1971 | Bickar ........................ | 137/99 |
| 3,737,251 | 6/1973 | Berman et al. ........................ | 417/12 |
| 4,006,752 | 2/1977 | DeVale ........................ | 137/101.21 |
| 4,007,755 | 2/1977 | Lerner et al. ........................ | 137/101.21 |

*Primary Examiner*—William R. Cline
*Assistant Examiner*—H. Jay Spiegel
*Attorney, Agent, or Firm*—Owen, Wickersham & Erickson

[57] ABSTRACT

An apparatus for mixing a first liquid component with at least one additional liquid component. A fluid flow-through measuring device in the form of a gear pulser is connected to a supply line for a first component and generates a number of electrical pulses corresponding to the flow volume. A geared feed pump connected to the supply line for each additional component is driven by an electric stepping motor. A current supply circuit for each stepping motor operates to maintain an adjusted mixing ratio in response to pulses generated by said flowthrough measuring device.

2 Claims, 2 Drawing Figures

MIXING APPARATUS FOR A FIRST LIQUID COMPONENT WITH AT LEAST ONE ADDITIONAL COMPONENT

This invention relates to apparatus for mixing a first liquid component with at least one additional liquid component.

BACKGROUND OF THE INVENTION

Mixing apparatus, as previously devised, comprised a supply line for each of the components and a fluid-flow measuring device connected to the supply line for the first component and capable of generating a number of electrical pulses corresponding to the flow volume. A feed pump connected to the supply line for each additional component had an electric driving motor for each feed pump, with a current supply circuit for each driving motor for maintaining an adjusted mixing ratio and to which the pulses generated by the fluid-flow measuring device were fed.

In a known mixing apparatus of the above described type, which was used as a dosing system for a two-component lacquer whose one component was the stock lacquer and the other a hardener, the fluid-flow measuring device was formed by a heat pulse emitter/receiver. With this structural element, heat pulses were supplied to the flowing stock lacquer component at the start of a measuring section, the arrival of the heat pulses at the end of the section being established. The transit time of the heat pulses was a measure for the flow volume. The frequency of a pulse generator was controlled in correspondence with said transit time. The pulses emitted by the pulse generator were supplied to an electronic control circuit as the set value.

As the actual value, the electronic regulator circuit received pulses from a fluid-flow measuring device which measured the flow volume of the hardener component and also operated according to the principle of the heat pulse emitter/receiver. The electronic regulator circuit generated a continuous regulating signal which was fed to a servomotor that drove a geared pump connected to the hardener conduit. The fluid-flow measuring device which measured the flow of the hardener component was connected to the output of the geared pump. The outputs of the two fluid-flow measuring devices were connected with a mixing and spraying unit and the mixing ratio was adjustable on the electronic regulating circuit.

The known mixing apparatus showed poor dynamic performance in the turn-on phase and in the turn-off phase. This was manifested by the adjusted mixing ratio remaining constant only a few seconds after turn-on. Therefore, the constancy of the mixing ratio of the lacquer which continued spraying during a short time after turn-off was not assured. Tests showed that this poor dynamic performance originated in the sluggishness of the heat pulse emitter/receiver used as the fluid-flow measuring device as well as on the natural transient response of the analogously operated regulator circuit and of the servomotor.

One general object of the invention is therefore to provide a mixing apparatus of the type described with improved dynamic performance.

Another object of the invention is to provide an improved mixing apparatus which excels in particular by the adjusted mixing ratio remaining constant immediately after turn-on.

BRIEF SUMMARY OF THE INVENTION

The aforesaid problems of the prior art are solved in accordance with the present invention by a new and improved mixing apparatus utilizing the combination of a fluid-flow measuring device which is a gear pulser, with a current supply circuit which is a control circuit and generates control pulses, a driving motor that is a stepping motor, and a geared feed pump.

The problem of transient response which heretofore negatively influenced the dynamic performance of mixing apparatus are eliminated by the use of a gear pulser and a digitally operating control circuit instead of the analogously operating regulator circuit. The desired digital control becomes possible only through the use of a stepped motor. In the known mixing apparatus, a regulator circuit was apparently used instead of a control circuit, since an analogously operating control circuit which is also required because of the analogously operating servomotor would not have assured constancy of the mixing ratio. The dynamic characteristic of the analogously operating servomotor showed a strong dependence on the operating voltage, the load and the temperature of the apparatus. In order to keep this dependence at least within acceptable limits, a regulator circuit had to be provided. This problem was eliminated by the use in accordance with the present invention of a stepped motor which has substantially greater accuracy of control than a servomotor and operates independently of fluctuations of the operational voltage, the temperature and the load. At least, the errors occurring with a stepped motor can be calculated with accuracy. Finally, the solution in accordance with the invention makes it possible also to use commercial electronic structural elements whereby the mixing apparatus may be produced economically.

In one embodiment of the invention the control circuit comprises a signal processing circuit to which pulses generated by the fluid-flow measuring device are fed. This circuit generates needle pulses whose duration is short in relation to the pulse recurrence time. The control circuit comprises a pulse generator which generates pulses with a very much shorter pulse recurrence time than the flow-through measuring device. The control circuit comprises a counter to which the pulses of the pulse generator are fed as counting pulses, either completely or partially depending on the desired mixing ratio. The needle impulses are fed as restorer pulses and generate at their output a binary signal corresponding to the number of counted pulses. The control circuit comprises an intermediate store to which the binary signal is fed as the signal to be stored as well as the needle pulses as read and clear pulses. The control circuit comprises a divider to which the complete pulses of the pulse generator are fed as well as the binary signal stored by the intermediate store and which generates at its output the control pulses for the stepping motor whose pulse recurrence time is equal to the pulse recurrence time of the pulses generated by the pulse generator, divided by the number corresponding to the binary signal.

Also, in accordance with the invention the control circuit may comprise a further divider whose divider ratio is adjustable corresponding to the desired mixing ratio. The pulses generated by the pulse generator are fed to the input of the further divider, and the output of the further divider is connected with the counter and with the first mentioned divider.

Other objects, advantages and features of the invention will become apparent from the following description of one embodiment thereof presented hereinafter in connection with the drawings.

DETAILED DESCRIPTION OF EMBODIMENT

Figure 1:
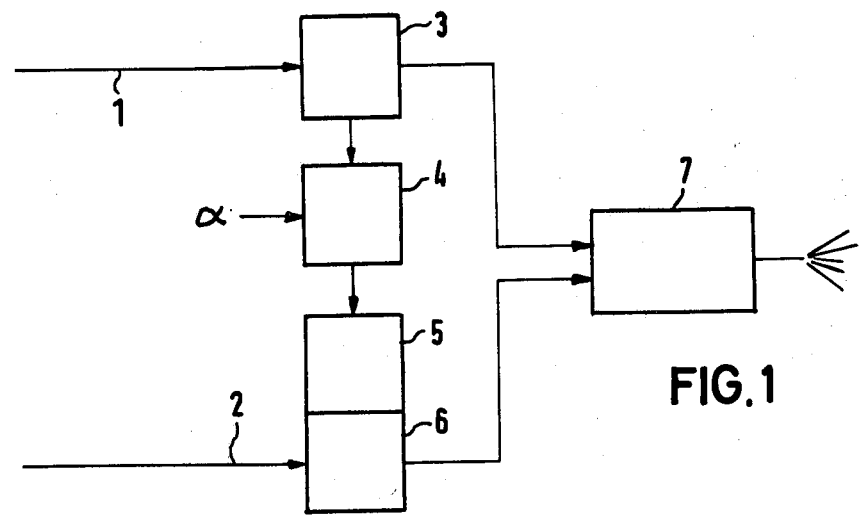
FIG. 1 is a block circuit diagram of the mixing apparatus according to the present invention.

The mixing apparatus shown in the block diagram of FIG. 1 is used as a dosing system for a two-component lacquer. The two components are stock lacquer and hardener. A gear pulser 3 is such a component, well known in the art, is described in British Patent Specification 1473566. The pulser 3 operates as a flow-through measuring device and generates set value pulses whose reccurrence time is a function of the flow rate. The pulses generated by the gear pulser 3 are fed to an electronic control circuit 4 with which the mixing ratio $\alpha$ can be adjusted.

The control circuit 4 in turn generates output pulses whose recurrence frequency is a function of the mixing ratio $\alpha$ and of the pulse recurrence frequency of the pulses emitted by the gear pulser 3. The output pulses of the control circuit 4 are fed to a stepping motor 5 which shifts one step further with each pulse. The stepping motor 5 drives a geared pump 6 which is connected to the hardener conduit 2. The geared pump may be of the well known type, as shown, for example, in the German Auslegeschrift No. 11 27 877. The outputs of the geared pulser 3 and of the geared pump 6 are connected with a mixing and spraying unit 7 which then ejects the stock lacquer-hardener mixture at the mixing ratio $\alpha$.

Figure 2:
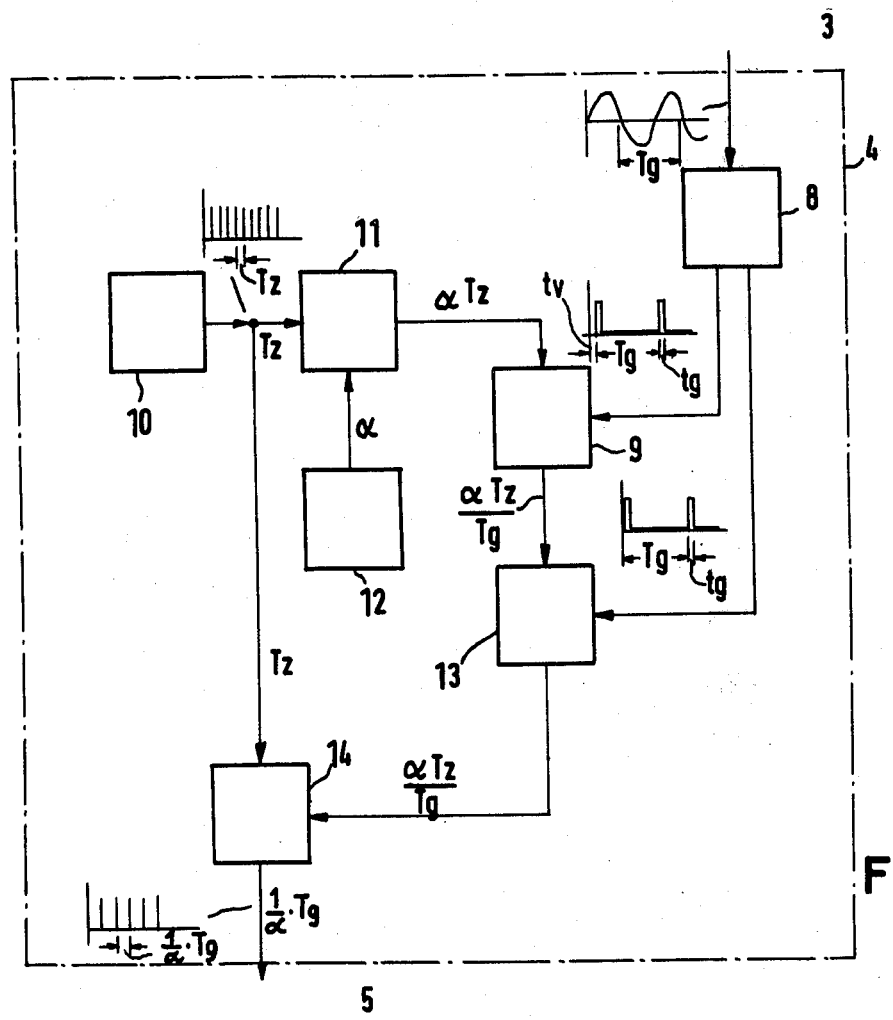
FIG. 2 is a block circuit diagram of the control circuit for the mixing apparatus of FIG. 1.

In FIG. 2, the control circuit 4 is shown in greater detail. The pulses emitted by the geared pulser 3 with the reccurence time $T_g$ are first fed to a signal processing circuit 8. The latter generates therefrom short needle pulses with the identical recurrence time $T_g$, but with a shorter pulse duration $t_g$. The pulse duration $t_g$ is very much shorter than the pulse reccurence time $T_g$.

The control circuit 4 further comprises a pulse generator 10 which generates pluses whose reccurence time $T_z$ is very much shorter than the pulse recurrence time $T_g$ of the pulses emitted by the geared pulser 3. The pulses of the pulse generator 10 are fed to a divider 11 (dividing circuit). The divider ratio of the divider 11 is adjustable by means of a coder 12 and corresponds to the desired mixing ratio of the two components.

At the output of the divider 11, an impulse sequence develops whose recurrence time $T_z$ is longer by the factor $\alpha$ than the reccurence time $T_z$ of the pulses emitted by the pulse generator 10.

The output pulses of the divider 11 are fed to a counter 9 as counting pulses. The signal processing circuit 8 further feeds to the counter 9 the needle pulses as restorer pulses. Accordingly, the counter 9 counts the output pulses of the divider 11 between two needle pulses. At the output of the counter 9, a binary signal occurs which is equal to the counted number of pulses.

The binary signal is fed to an intermediate store 13. The latter is also supplied by the signal processing circuit 8 with needle pulses which in this case represent the information and the erase signals. Each time the intermediate store 13 is supplied with a needle pulse, the binary signal stored in it is erased and a new binary signal developing at the output of the counter 9 is written-in. Compared with the needle pulses fed to the intermediate store 13, the needle pulses fed to the counter 9 are delayed by a short time $t_v$ in order to insure that the intermediate store 13 is erased before the counter 9 so as to take over the results from the counter 9.

At the output of the intermediate store 13, a binary signal therefore also develops, but in comparision with the binary signal developing at the output of the counter 9, it is delayed by one period.

The pulses generated by the pulse generator 10 are fed to a further divider 14. For adjustment of the dividing ratio, the divider 14 is further connected with the output of the intermediate store 13. Accordingly, the divider 14 divides the pulses generated by the pulse generator 10 through the binary signal which develops at the output of the intermediate store 13.

As may be seen in FIG. 2, an impluse sequence develops at the output of the divider 14 which has a recurrence time $T_g$, divided by the factor $\alpha$. This impulse sequence which is fed to the stepping motor 5 is therefore dependent only on the pulse recurrence time $t_g$ of the pulses supplied by the gear pulser 3 and the divider value $\alpha$ which is manually adjustable on the coder 12.

In conclusion, it should be noted further that "needle pulses" are quite generally understood to be pulses whose duration is short as compared with the pulse recurrence time.

I claim:

1. An apparatus for mixing a first liquid component with at least one additional liquid component, comprising:

a supply line for each of the components; a fluid flow-through measuring device connected to said supply line for said first component and generating a number of electrical pulses corresponding to the flow volume; a feed pump connected to said supply line for each additional component; an electric driving motor for each feed pump; and a current supply circuit for each driving motor maintaining an adjusted mixing ratio, and to which pulses generated by said flow-through measuring device are fed, wherein said flow-through measuring device is a gear pulser, said driving motor is a stepping motor, said feed pump is a geared pump, and said current supply circuit is a control circuit for generating control pulses, said control circuit comprising a signal processing circuit to which impulses generated by said flow-through measuring device are fed and which generates needle pulses therefrom whose time duration ($t_g$) is short in relation to the pulse recurrence time ($T_g$), said control circuit also comprising a pulse generator which generates pulses with a much shorter recurrence time ($T_z$) than said flow-through measuring device, and said control circuit also comprising a counter to which the pulses of said pulse generator are fed as counting pulses, either completely or partially depending on the desired mixing ratio ($\alpha$), and said needle pulses are fed as restorer pulses, and which generates at its output a binary signal corresponding to the number of counted pulses, and said control circuit further comprising an intermediate store to which said binary signal and said needle pulse are fed as the signals to be stored, and said control circuit additionally comprising a divider to which the complete pulses of said generator are fed as well as the binary signal stored by said intermediate store and which generates at its output the control pulses for said stepping motor whose pulse recurrence time ($T_g/\alpha$) is equal to the pulse recurrence time ($T_z$) of the pulses generated by said pulse generator divided by the number $\alpha T_z/T_g$ corresponding to the binary signal.

2. A mixing apparatus as described in claim 1, wherein said control circuit comprises a further divider whose divider ratio is adjustable corresponding to the desired mixing ratio ($\alpha$), in that the pulses generated by said pulse generator are fed to the input of said further divider, and in that the output of the further divider is connected with said counter and said first-mentioned divider.

* * * * *

UNITED STATES PATENT AND TRADEMARK OFFICE
CERTIFICATE OF CORRECTION

PATENT NO. : 4,176,672
DATED : December 4, 1979
INVENTOR(S) : HARTMUT BORBERG

It is certified that error appears in the above-identified patent and that said Letters Patent are hereby corrected as shown below:

Column 4, line 8, "comparision" should read --comparison--.
Column 4, line 64, "pulse" should read --pulses--.

Signed and Sealed this

Eighth Day of July 1980

[SEAL]

Attest:

SIDNEY A. DIAMOND

Attesting Officer     Commissioner of Patents and Trademarks